United States Patent
Asher

(10) Patent No.: US 11,091,011 B2
(45) Date of Patent: Aug. 17, 2021

(54) VEHICLE DIAGNOSTIC SYSTEM

(71) Applicant: Nissan North America, Inc., Franklin, TN (US)

(72) Inventor: Simon Asher, Windsor (CA)

(73) Assignee: NISSAN NORTH AMERICA, INC., Franklin, TN (US)

( * ) Notice: Subject to any disclaimer, the term of this patent is extended or adjusted under 35 U.S.C. 154(b) by 467 days.

(21) Appl. No.: 15/939,724

(22) Filed: Mar. 29, 2018

(65) Prior Publication Data
US 2019/0299756 A1  Oct. 3, 2019

(51) Int. Cl.
*B60J 5/04* (2006.01)
*E05F 15/77* (2015.01)
*G07C 5/08* (2006.01)

(52) U.S. Cl.
CPC ............. *B60J 5/0416* (2013.01); *E05F 15/77* (2015.01); *G07C 5/0808* (2013.01); *E05Y 2400/45* (2013.01); *E05Y 2900/531* (2013.01)

(58) Field of Classification Search
CPC ...... B60J 5/0416; E05F 15/77; G07C 5/0808; G07C 9/00309; G07C 2009/00507; G07C 5/08; E05Y 2400/45; E05Y 2900/531; B60R 25/241; B60C 23/0435
See application file for complete search history.

(56) References Cited

U.S. PATENT DOCUMENTS

| | | | |
|---|---|---|---|
| RE45,166 E * | 9/2014 | Luo | G06K 19/0723 455/73 |
| 9,243,441 B2 | 1/2016 | Gupta et al. | |
| 9,380,540 B1 * | 6/2016 | Hermann | H03F 3/245 |
| 9,647,482 B2 | 5/2017 | Rudolph | |
| 2003/0119453 A1 * | 6/2003 | Blatz | G06K 19/0723 455/73 |
| 2005/0162259 A1 * | 7/2005 | Hotta | G07C 9/00309 340/426.13 |

(Continued)

FOREIGN PATENT DOCUMENTS

WO  WO-2010141033 A1 * 12/2010 ......... G07C 9/00309

OTHER PUBLICATIONS

Wikipedia, s.v. "Control-Alt-Delete," accessed Jun. 16, 2020 (https://en.wikipedia.org/wiki/Control-Alt-Delete#History) (Year: 2020).*

*Primary Examiner* — Donald J Wallace
*Assistant Examiner* — Daniel M. Robert
(74) *Attorney, Agent, or Firm* — Global IP Counselors, LLP

(57) ABSTRACT

A keyfob has an electronic controller, a plurality of command inputs, a keyfob antenna and a feedback device. The plurality of command inputs, the keyfob antenna and the feedback device are in electronic communication with the controller. The controller is configured to send signals to a vehicle door lock system in response to operation one or more of the plurality of command inputs that instruct the vehicle door lock system to switch at least one door between a locked state and an unlocked state. The controller is further configured to enter a diagnostic mode in response to a predetermined operation of the plurality of command inputs such that in the diagnostic mode the keyfob operates as a diagnostic tool that detects an operating state of at least one of the keyfob and the vehicle door lock system.

18 Claims, 5 Drawing Sheets

(56) References Cited

U.S. PATENT DOCUMENTS

| | | | | |
|---|---|---|---|---|
| 2006/0267787 | A1* | 11/2006 | Marlett | G07C 5/0816 |
| | | | | 340/652 |
| 2010/0052574 | A1* | 3/2010 | Blakeley | H05B 47/105 |
| | | | | 315/307 |
| 2010/0321154 | A1* | 12/2010 | Ghabra | G07C 9/00309 |
| | | | | 340/5.61 |
| 2012/0313768 | A1* | 12/2012 | Campbell | B60R 25/2018 |
| | | | | 340/438 |
| 2013/0049929 | A1* | 2/2013 | Gerlach | E05F 15/77 |
| | | | | 340/5.64 |
| 2015/0102900 | A1* | 4/2015 | Ramchandani | G08C 17/02 |
| | | | | 340/5.25 |
| 2017/0236344 | A1* | 8/2017 | Murar | G07C 9/20 |
| | | | | 340/5.61 |
| 2019/0264465 | A1* | 8/2019 | Adje | G07C 9/00174 |

* cited by examiner

VEHICLE DIAGNOSTIC SYSTEM

BACKGROUND

Field of the Invention

The present invention generally relates to vehicle diagnostic system. More specifically, the present invention relates to keyfob of a vehicle door lock system that includes a vehicle diagnostic system that is used to test the operational status of elements of a door lock system.

Background Information

Many vehicles include electric door lock systems that communicate with a keyfob operated by a vehicle operator to remotely lock and unlock doors of the vehicle. Electric door lock systems include components that are not easily tested when those components wear out or fail.

SUMMARY

One object of the disclosure is to provide a keyfob of a vehicle door lock system with a diagnostic capability used to diagnose operation of elements of the vehicle door lock system.

In view of the state of the known technology, one aspect of the present disclosure is to provide a vehicle diagnostic system as part of a vehicle keyfob. The keyfob has an electronic controller, a plurality of command inputs, a keyfob antenna and a feedback device. The plurality of command inputs, the keyfob antenna and the feedback device are in electronic communication with the controller. The controller is configured to send signals to a vehicle door lock system in response to operation one or more of the plurality of command inputs that instruct the vehicle door lock system to switch at least one door between a locked state and an unlocked state. The controller is further configured to enter a diagnostic mode in response to a predetermined operation of the plurality of command inputs such that in the diagnostic mode the keyfob operates as a diagnostic tool that detects an operating state of at least one of the keyfob and the vehicle door lock system. Thereafter, the controller operates the feedback device to provide an indication of the operating state of the at least one of the keyfob and the vehicle door lock system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
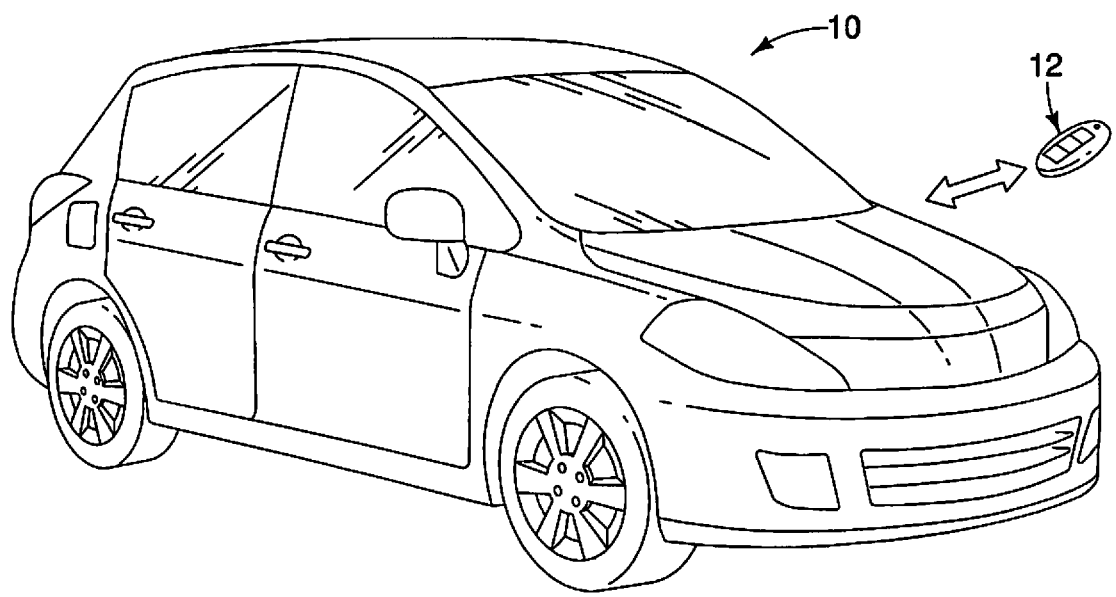
FIG. 1 is a perspective view of a vehicle and a corresponding keyfob in accordance with a depicted embodiment.

Referring initially to FIG. 1, a vehicle 10 and keyfob 12 are illustrated in accordance with a first embodiment. The keyfob 12 includes a vehicle diagnostic system 14 (FIG. 4) that is configured to test operational status of components of the vehicle 10 and the keyfob 12, as is described in greater detail below.

Figure 2:
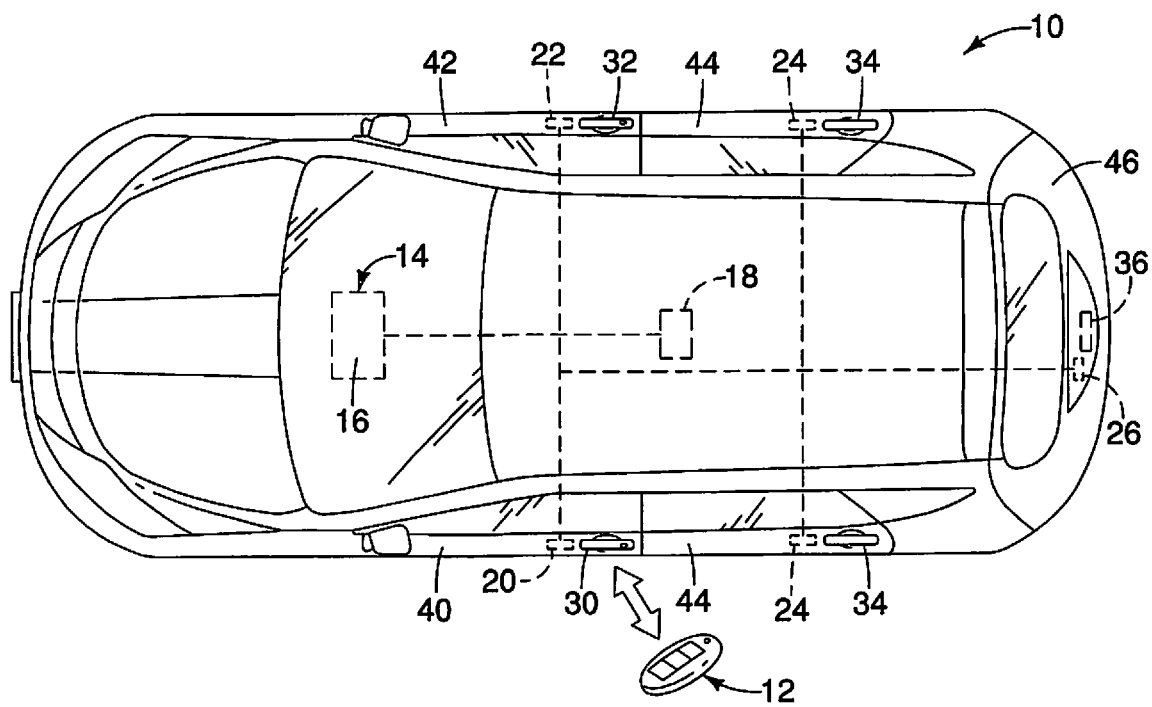
FIG. 2 is a top schematic view of the vehicle and the corresponding keyfob showing elements of a door lock system such as a door lock controller, a radio frequency receiver, door handle mechanisms that include antennae and electronic door locks in accordance with one embodiment.
Figure 4:
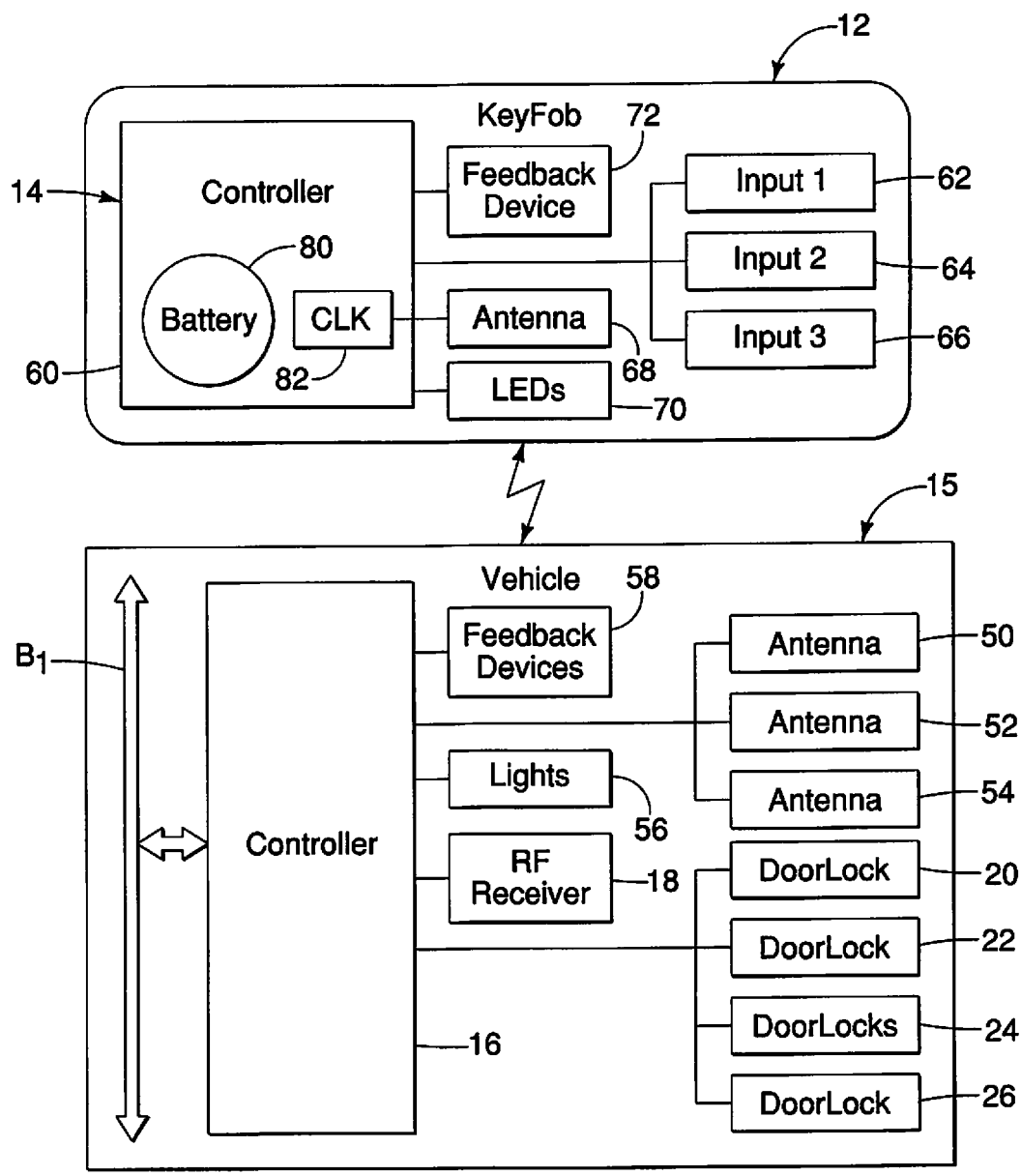
FIG. 4 is a schematic diagram showing the various elements of the keyfob and the elements of the door lock system of the vehicle depicted in FIGS. 1 and 2, in accordance with the depicted embodiment.

The vehicle 10 includes a variety of systems, including a door lock system 15. As shown in FIGS. 2 and 4, the door lock system 15 includes an electronic controller 16, a radio signal receiver 18, a driver's door lock 20, a passenger's door lock 22, rear door locks 24 and a rear hatch lock 26. The electronic controller 16 can be an electronic circuit board dedicated to door lock operations, or can be a part of, or programmed into a body control module (BCM) of the vehicle 10. Since body control modules (BCMs) are conventional vehicle components, further description of body control modules is omitted for the sake of brevity. The radio signal receiver 18 is configured to detect and receive radio signals broadcasted from the keyfob 12, as is described in greater detail below. The controller 16 can further be connected to other components and/or controllers of the vehicle 10 via a bus $B_1$.

As shown in FIG. 2, the vehicle 10 includes a driver's door handle mechanism 30, a passenger's door handle mechanism 32, rear door handle mechanisms 34 and a rear hatch door mechanism 36. The driver's door handle mechanism 30 is operated to open a driver's door 40, the passenger's door handle mechanism 32 is operated to open a passenger's door 42, the rear door handle mechanisms 34 are operated to open rear doors 44, and the rear hatch door mechanism 36 is operated to open a rear hatch 46 in a conventional manner.

The driver's door lock 20 is an electro/mechanical device that locks and unlocks the driver's door 40 such that in a locked orientation (locked state), the driver's door handle mechanism 30 does not open the driver's door 40 and in the unlocked orientation (unlocked state), the driver's door handle mechanism 30 is operable to open the driver's door 40.

The passenger's door lock 22 is an electro/mechanical device that locks and unlocks the passenger's door 42 such that in a locked orientation, the passenger's door handle mechanism 32 does not open the passenger's door 42 and in the unlocked orientation, the driver's door handle mechanism 30 is operable to open the driver's door 40.

The rear door locks 24 are electro/mechanical devices that also lock and unlock the passenger's door 42. The rear hatch lock 26 is an electro/mechanical device that locks and unlocks the rear hatch 46 such that in a locked orientation, the rear hatch door mechanism 32 does not open the rear hatch 46 and in the unlocked orientation, the rear hatch door mechanism 36 is operable to open the rear hatch 46.

The driver's door handle mechanism 30 includes an antenna 50 (FIG. 4) associated therewith (for example in the handle of the driver's door handle mechanism 30). Similarly, the passenger's door handle mechanism 32 includes an antenna 52 (FIG. 4) associated therewith, and the rear hatch door mechanism 36 includes an antenna 54 (FIG. 4) associated therewith. The antennae 50, 52 and 54 are all connected to the electronic controller 16, as shown in FIG. 4. Each of the antennae 50, 52 and 54 is configured to broadcast a low frequency signal designed to be detected by the keyfob 12, as described further below. The low frequency signals sent by the antennae 50, 52 and 54 are at, for example, either 105 kHz or 125 kHz. However, the low frequency signals can be set at a predetermined value anywhere within the low frequency range of 30 kHz to 300 kHz.

As shown in FIG. 4, the door lock system 15 can also be connected to, for example, vehicle lights 56 and feedback devices 58. The vehicle lights 56 can include headlights of the vehicle and/or warning lights (not shown) on the instrument cluster (not shown) within the vehicle 10. The feedback devices 58 can include the vehicle horn (not shown), the warning lights (not shown) on the instrument cluster (not shown) within the vehicle 10, and/or a buzz and/or bell-like sound generator within the vehicle 10 alerting a vehicle operator of a predetermined condition or conditions relating to the door lock system 15.

Figure 3:
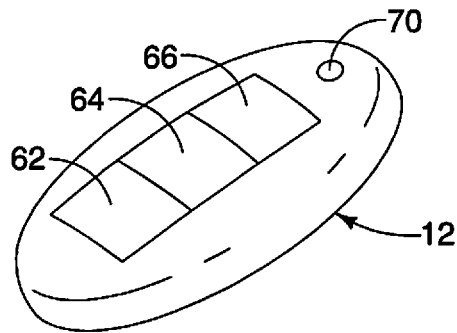
FIG. 3 is a perspective view of the keyfob showing three command input buttons and a feedback device (an LED) in accordance with the depicted embodiment.

Descriptions of the keyfob 12 and the vehicle diagnostic system 14 are now provided with specific reference to FIGS. 3-7. As shown in FIGS. 3 and 4, the keyfob 12 basically includes an electronic controller 60 (also referred to as the controller 60), a plurality of command inputs 62, 64 and 66, a keyfob antenna 68, LED 70 (light emitting diode or diodes) and a feedback device 72. The command inputs 62, 64 and 66, the keyfob antenna 68 (also referred to as the antenna 68), the LED 70 and the feedback device 72 are in electronic communication with the controller 60. The controller 60, the command inputs 62, 64 and 66, the keyfob antenna 68, the LED 70 and the feedback device 72 also basically define the vehicle diagnostic system 14. The command inputs 62, 64 and 66 are, for example, simple switches that respond to an operator pressing on the exposed surfaces of the command inputs 62, 64 and 66. When pressed, each of the command inputs 62, 64 and 66 trigger the controller 60 to send a high frequency radio signal to the radio signal receiver 18 of the vehicle 10, and more specifically to the controller 16. The radio frequency signal is preferable a high frequency signal that is at, for example, 33 MHz. However, the radio frequency can set to be any predetermined value between, for example, 30 MHz and 300 MHz.

Pressing of any one of the command inputs 62, 64 and 66 can also cause the LED 70 to blink, thereby confirming that the keyfob 12 is working properly.

Signals sent by the keyfob antenna 68 as instructed by the controller 60 include two parts. A first part of the signal includes an identification code identifying the keyfob 12 such that the controller 16 of the door lock system 15 can determine whether or not the signal is from a keyfob associated with the vehicle 10. A second part of the signal includes a specific instruction, as described below.

The controller 60 operates in at least two different modes, a standard operating mode and a diagnostic mode. In the standard operating mode, the command inputs 62, 64 and 66 are each assigned to cause the controller 60 to issue a specific command. For example, when only the command input 62 is pressed, the controller 60 causes the antenna 68 to send a signal corresponding to a specific operation assigned to the command input 62. In the depicted embodiment, the command input 62 sends a signal to the vehicle 10 that causes the controller 16 to flash the vehicle lights and sound the vehicle horn (not shown). When the command input 64 is pressed, the controller 16 sends a signal to unlock the doors of the vehicle 10. When the command input 66 is pressed, the controller 16 sends a signal to lock the doors of the vehicle 10.

The keyfob antenna 68 (also referred to as the antenna 68) is configured to detect and receive the low frequency signals sent by each of the antennae 50, 52 and 54 of the door lock system 15. The signals put out by the antennae 50, 52 and 54 are controlled by the controller 16, and can be timed to occur at specific intervals and/or sequences such that the keyfob antenna 68 can respond accordingly to those signals.

The signals received by any one of the antennae 50, 52 and 54 cause the keyfob 12 to issue at least the first part of the keyfob's signal. Specifically, when the keyfob 12 receives a signal from any one of the antennae 50, 52 and 54, the keyfob 12 broadcasts the identification code identifying the keyfob 12 as a keyfob associated with the vehicle 10. The keyfob 12 can be programmed to send its signals to the radio signal receiver 18 of the door lock system 15 in response to the specific signal received from one of the antennae 50, 52 and 54, thereby providing the door lock system 15 with a reference to determine the approximate location of the keyfob 12 relative to the vehicle and the one of the antennae 50, 52 and 54 the keyfob 12 is closest to. This is one of many possible methods used by the controller 16 and the controller 60 to determine proximity of the keyfob 12 relative to which ever of the antennae 50, 52 and 54 is closest to the keyfob 12. As a result, the door lock system 15 can enable a corresponding button on the driver's door handle mechanism 30, a corresponding button on the passenger's door handle mechanism 32, or a corresponding button on the rear hatch door mechanism 36 such that when a vehicle operator in possession of the keyfob 12, can press the corresponding button and unlock the adjacent one of the driver's door 40, the passenger's door 42 or the rear hatch 46, in a conventional manner.

Figure 5:
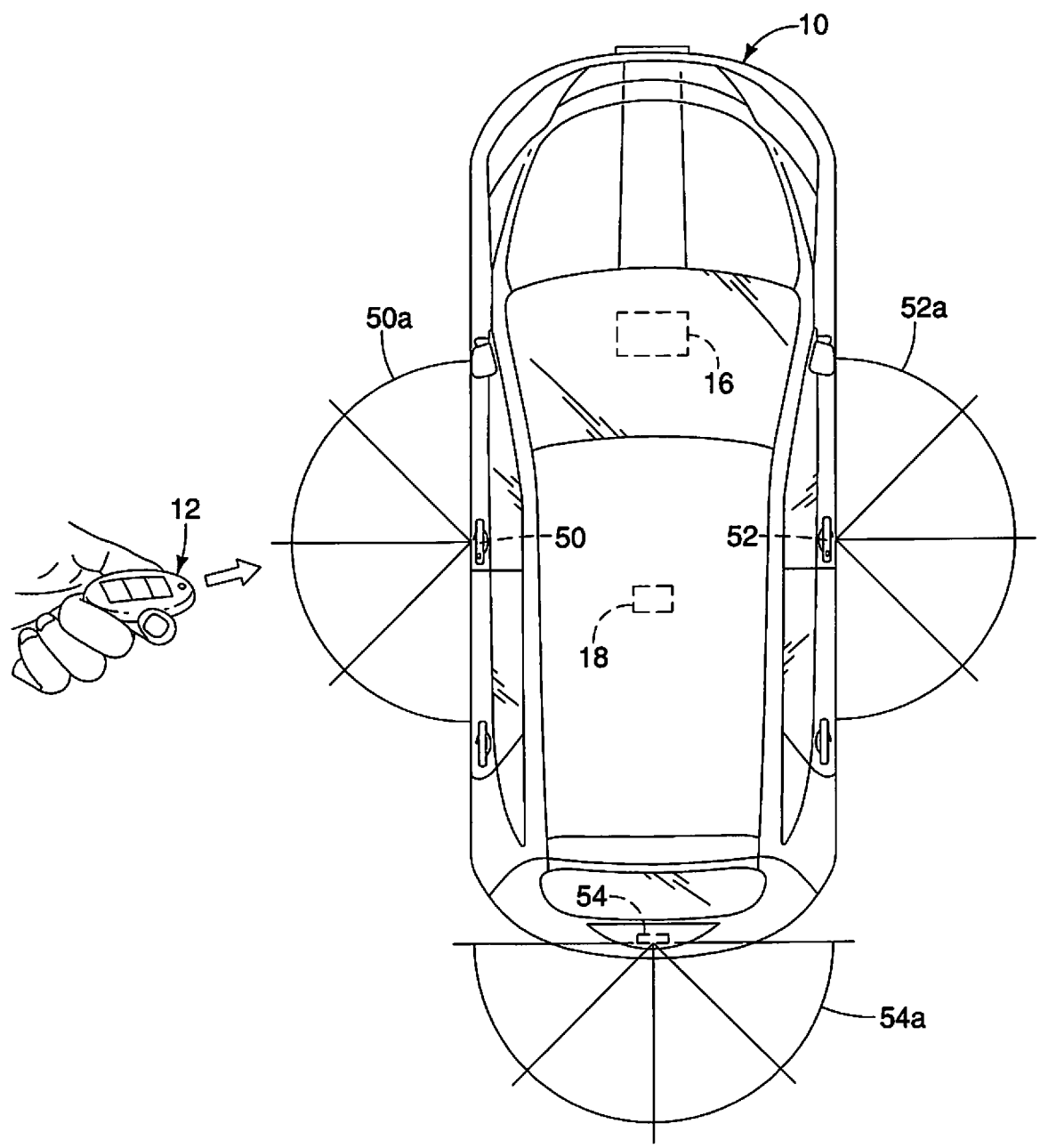
FIG. 5 is a schematic overhead view of the vehicle showing the antennae of the door handle mechanisms and showing zones that represent areas around each of the antennae where the keyfob is likely to receive low frequency signals from the antennae in accordance with the depicted embodiment.

As shown in FIG. 5, since the antennae 50, 52 and 54 put out weak low frequency signals that can only be detected by the keyfob 12 with the keyfob 12 is close to one of the antennae 50, 52 and 54. More specifically, the keyfob 12 must be within one of the zones 50a, 52a or 54a in order to receive the low frequency signal produced by the corresponding one of the antennae 50, 52 or 54. The zones 50a, 52a and 54a can be, for example, a five, seven, or ten food radius around an exterior surface of the vehicle 10, with the corresponding one of the antennae 50, 52 or 54 defining a center point of the corresponding one of the zones 50a, 52a and 54a. The keyfob 12 takes advantage of these proximity relationships in the diagnostic mode as well.

The keyfob 12 is configured to enter the diagnostic mode in response to operation of the command inputs 62, 64 and 66 in a predetermined manner. For example, if a specific combination of the command inputs 62, 64 and 66 are simultaneously pressed and held in place for 10 seconds, the controller 60 responds by entering the diagnostic mode. One such specific combination can be the pressing of all three command inputs 62, 64 and 66 simultaneously for a predetermined period of time, or, pressing of a predetermined pair of the command inputs 62, 64 and 66 for the predetermined period of time. The predetermined period of time can be any time interval between, for example 5 and 25 seconds. In the depicted embodiment, the predetermined period of time is 10 seconds.

Once in the diagnostic mode, the keyfob 12 takes on differing functions. In one phase of the diagnostic mode, the keyfob 12 is used to diagnose a possible malfunction in the door lock system 15. For example, if one of the doors fails to manually unlock via the pressing of one of the driver's door handle mechanism 30, the passenger's door handle mechanism 32 and/or the rear hatch door mechanism 36, the keyfob 12 can be used to determine whether or not the antennae 50, 52 or 54 of the door lock system 15 are broadcasting their respective low frequency signals. Specifically, in the diagnostic mode, a technician or the vehicle operator moves one by one to each of the antennae 50, 52 or 54. As the keyfob 12 enters the corresponding one of the zones 50a, 52a and 54a, the controller 60 receives the low frequency transmission therefrom and causes the LED 70 to light up or blink. Optionally, in response to the controller 60 receiving the low frequency transmission from one nearest one of the antennae 50, 52 or 54, the controller 60 can be configured to increase the frequency of the blinking of the LED 70 as the keyfob 12 gets closer to the corresponding one of the antennae 50, 52 or 54. For example, near the outer periphery of the corresponding one of the zones 50a, 52a and 54a, the controller 60 can cause the LED 70 to blink slowly at a rate of between 30-40 blinks per minute. As the keyfob 12 moves closer to the corresponding one of the antennae 50, 52 or 54, the rate of blinking can be increased, for example, 100 blinks per minute. If no signal is received from the corresponding one of the antennae 50, 52 or 54, the LED 70 does not blink.

Thus, the technician or vehicle operator can determine whether or not any one of the antennae 50, 52 or 54 is operating properly.

The controller 60 of the keyfob 12 can also be configured to enter a second phase of the diagnostic mode by, for example, responding to a second predetermined sequence of operation of the command inputs 62, 64 and 66 while in the diagnostic mode. The second predetermined sequence of operation of the command inputs 62, 64 and 66 can be, for example, the pressing and holding of two of command inputs 62, 64 and 66, or again pressing of all three of the command inputs 62, 64 and 66 for the predetermined period of time discussed above. In the second phase of the diagnostic mode, the controller 60 checks an internal battery $B_1$ that provides power to the keyfob 12 and to the controller 60. The controller 60 determines the level remaining power within the batter $B_1$ and operates the LED 70 indicating the determined level of remaining power. For example, if the controller 60 determines that the battery 80 is putting out a full charge (new) then the controller 60 operates the LED 70 to blink four times in succession, then pause and repeat with another four blinks. If the battery 80 is putting out 80% of its expected charge compared to a full charge, the controller operates the LED 70 to blink three times in succession, pause and then repeat. Further, if the battery 80 is putting out 70% of its expected charge compared to a full charge, the controller operates the LED 70 to blink two times in succession, pause and then repeat. If the battery 80 is putting out 60% of its expected charge compared to a full charge, the controller operates the LED 70 to blink once, pause and then blink once again.

Table 1 shows charge potentials used by the controller 60 when determined the current charge of the battery 80 when the battery 80 is a conventional 3 volt battery.

TABLE 1

| Battery Voltage | Determined Power Potential | Blinks |
| --- | --- | --- |
| 3.1 V | 100% | 4 blinks |
| 3.0 V | 80% | 3 blink |
| 2.9 V | 70% | 2 blinks |
| 2.8 V | 60% | 1 blink |

It should be understood from the drawings and the description herein that the battery 80 can be any of a variety of battery types and that the information in Table 1 is only applicable to a conventional 3 volt battery. Other battery types can have other criteria for determining the current status (and potential life expectancy) of other battery types.

In the above description, the controller 60 operates the LED 70 in order to inform a technician or a vehicle operator of the status of the information determined by the keyfob 12 when in the diagnostic mode. The keyfob 12 is provided with the feedback device 72. The feedback device 72 can be a noise producing device such as a buzzer or ringtone producing device. Further, the feedback device 72 can be a haptic device that provides a physically detectable output, such as a vibration. Since the keyfob 12 is typically a hand held device, the person holding the keyfob 12 will feel an output provided by the feedback device 72. The feedback device 72 can be used by the controller 60 as an alternative to using the LED 70, or can be used in addition to the LED 70, thereby increasing the possible outputs to the technician or vehicle operator when using the keyfob 12. For example, the controller 60 can be configured to control blinking of the LED 70 in the diagnostic mode such that when testing the antenna 50, the LED 70 blinks using a first color. As well, the controller 60 can be configured to control blinking of the LED 70 in the diagnostic mode such that when testing the antenna 52, the LED 70 blinks using a second color. The controller 60 can be configured to control blinking of the LED 70 in the diagnostic mode such that when testing the antenna 54, the LED 70 blinks using a third color.

It should be understood from the description above, that the keyfob 12 can have additional diagnosing capabilities when in the diagnostic mode and is not limited to the diagnostic operations discussed above. It should further be understood that the LED 70 is a feedback device in and of itself.

The LED 70 can also include a plurality of LED lights, each outputting a difference color. Therefore, the controller 60 can operate the LED 70 to output any of the different colors produced by the LED 70, where each color represents a different condition detected by the controller 60 in the diagnostic mode.

To exit the diagnostic mode, the technician or vehicle operator merely pressed only one of the buttons for a predetermined period of time to return to the normal operating mode (or normal operating state). Further, the controller 60 of the keyfob 12 can includes a timing circuit 82 or clock that is used to measure the predetermined periods of time described above. The timing circuit 82 can also be used by the controller 60 to exit the diagnostic mode. Specifically, when in the diagnostic mode, the controller 60 determines whether or not a predetermined time-out interval has elapsed. If so, the controller 60 automatically exits the diagnostic mode. The predetermined time-out interval can be, for example, one minute or two minutes.

In the above described diagnosis of the operating condition of the antennae 50, 52 and 54, the keyfob 12 basically has sole operational control of the diagnostic procedure requiring nothing from the vehicle 10 and the door lock system 15, except that the door lock system 15 operates the antennae 50, 52 and 54 in a normal mode of operation with respect to the proximity of the keyfob 12. Alternatively, the controller 16 of the door lock system 15 of the vehicle 10 can be configured to recognize when the keyfob 12 has entered the diagnostic mode and cooperate with the keyfob 12.

Specifically, when the keyfob 12 is put into the diagnostic mode, the vehicle 10 can also be put into a diagnostic mode and detect diagnostic related signals from the keyfob 12 and respond accordingly to those signals. In the diagnostic mode in cooperation with the vehicle 10, the controller 60 of the vehicle diagnostic system 14 in the keyfob 12 can be configured to output signals in response to specific inputs via the command inputs 62, 64 and 66. For example, in response to pressing of a first predetermined one or more of the command inputs 62, 64 and 66, the vehicle 10 only operates a first of the antennae 50, 52 or 54 for testing; in response to pressing of a second predetermined one or more of the command inputs 62, 64 and 66, the vehicle 10 only operates a second of the antennae 50, 52 or 54 for testing; and in response to pressing of a third predetermined one or more of the command inputs 62, 64 and 66, the vehicle 10 only operates a first of the antennae 50, 52 or 54 for testing.

In yet another alternative testing procedure, the controller 60 can be configured to receive signals caused by pressing of yet another predetermined one or more of the command inputs 62, 64 and 66 causing the controller 60 to send a diagnostic signal to the controller 16 of the door lock system 15. In response to receiving the diagnostic signal, the controller 16 initially causes the first antenna 50 to operate and waits for a response from the keyfob 12. In response to receiving signals from the first antenna 50, the LED 70 is made to blink. Thereafter, the keyfob 12 either automatically, or in response to pressing of a specific one of the command inputs 62, 64 and 66, sends a confirmation signal to the door lock system 15 that the first antenna 50 passed the diagnostic test and is operating properly. The door lock system 15 then flashes the headlights of the vehicle 10 or causes the horn to emit a single sound. The vehicle 10 waits a predetermined period of time (so that the technician or vehicle operator can move to the next door) and causes the second antenna 52 to operate and waits for a response from the keyfob 12. In response to receiving signals from the second antenna 52, the LED 70 is made to blink. Thereafter, the keyfob 12 either automatically, or in response to pressing of a specific one of the command inputs 62, 64 and 66, sends another confirmation signal to the door lock system 15 that the first antenna 50 passed the diagnostic test and is operating properly. This process can be repeated for the third antenna 54, and further for the radio signal receiver 18 and any other antennae or receivers within the passenger compartment.

Although not described at length above, it should be understood from the description herein that the vehicle 10 can include one or more antennae within the vehicle 10 that are used by the controller 16 (and/or the body control module) to confirm the presence of the keyfob 12 within the vehicle 10. For example, if the vehicle 10 has a push button start system, push button start operation are only enabled when it is determined that the keyfob 12 is physically located within the passenger compartment of the vehicle 10.

Further during normal operation of the keyfob 12, the keyfob 12 continuously sniffs for low frequency signals in order to determine whether or not the vehicle 10 is nearby. Upon detecting a valid/registered signal from the vehicle 10, the controller 60 can cause the LED 70 to illuminate confirming the presence of the vehicle 10 and communications between the vehicle 10 and the keyfob 12.

A description of one example of logic programmed or otherwise stored within the keyfob 12 is now described with reference to FIGS. 6 and 7.

Figure 6:
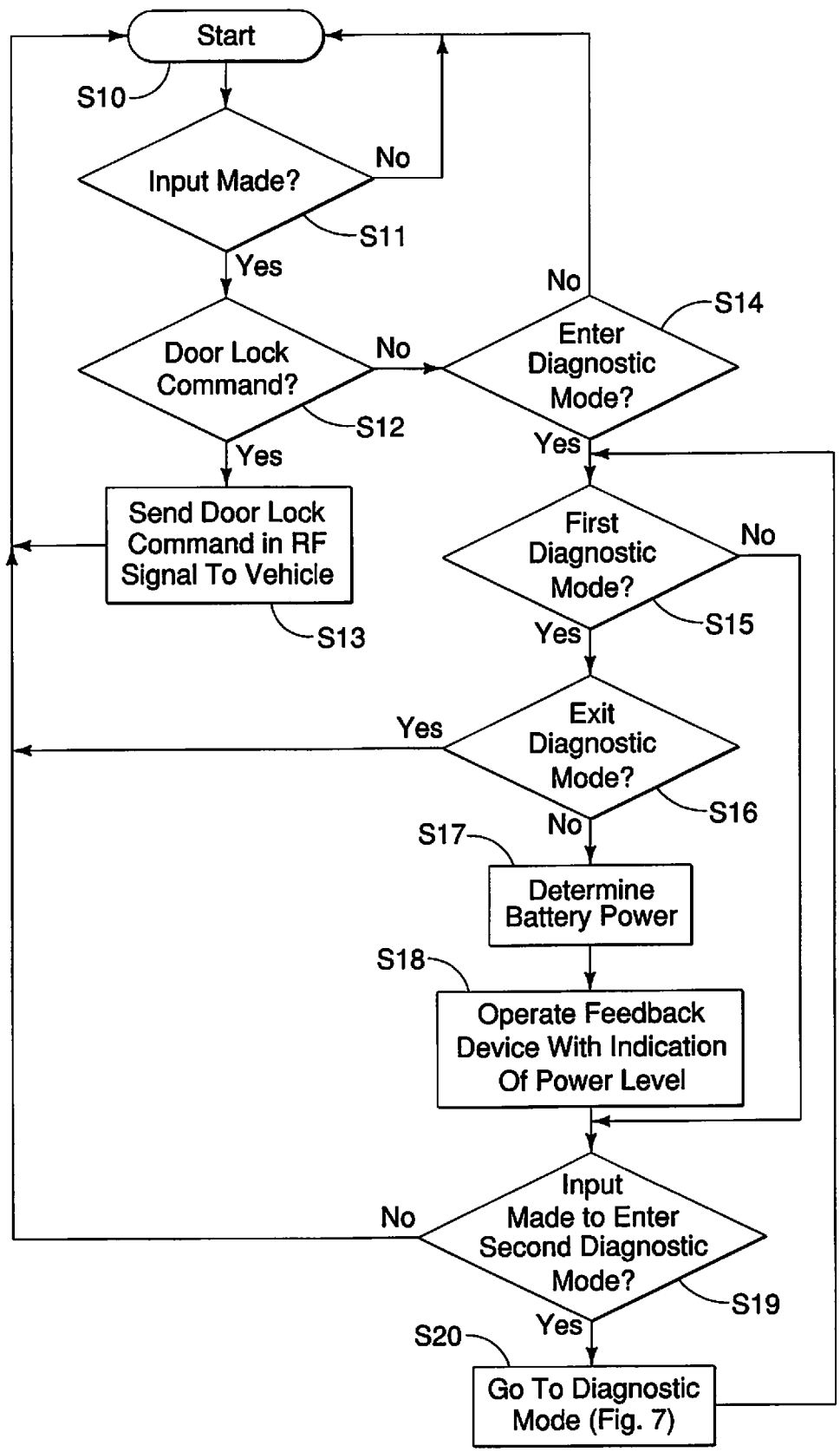
FIG. 6 is a first flowchart showing an example of logic used by the controller of the keyfob in accordance with the depicted embodiment.

As shown in FIG. 6, at S10 the logic used by the keyfob 12 is in standby mode continuously sniffing for activity. Once the keyfob 12 detects a low frequency signal (indicating proximity to the vehicle 10), the controller 60 moves to step S11. At step S11, the controller 60 determines whether or not an input has been made via pressing of one or more of the command inputs 62, 64, and 66. If not, the controller 60 returns to the standby mode in step S10. If yes, operation then moves to step S12. At step S12, the controller 60 determines whether or not a door lock/unlock command has been inputted using one of the command inputs 62, 64, and 66. If yes, then operation moves the step S13 where the controller 60 causes the keyfob antenna 68 to transmit a signal with identification information and command information (lock, unlock or alarm signal) to the vehicle 10. If no, the operation moves to step S14.

At step S14, the controller 60 determines whether or not the input corresponds to entering the diagnostic mode. If no, the controller 60 returns to the standby mode in step S10. If yes, then the controller 60 moves to step S15. At step S15, the controller 60 determines whether or not a first diagnostic mode has been enabled (corresponding to a request to check battery status). If so, then operation moves to S16 where the controller 60 determines whether or not to exit the diagnostic mode (either via timing out, or a command input). If yes, the controller 60 returns to the standby mode in step S10. If not, operation moves to step S17 where the battery power (battery status) is determined. Next at step S18, one of the LED 70 and the feedback device 72 is operated to provide the determined battery status. Next at step S19, the controller 60 determines whether or not a second diagnostic mode has been requested via a command input. If not, the controller 60 returns to the standby mode in step S10. If yes, operation moves to step S20.

Returning now to step S15, if the first diagnostic mode was not requested, but instead the second diagnostic mode was requested, operation moves to step S20.

Figure 7:
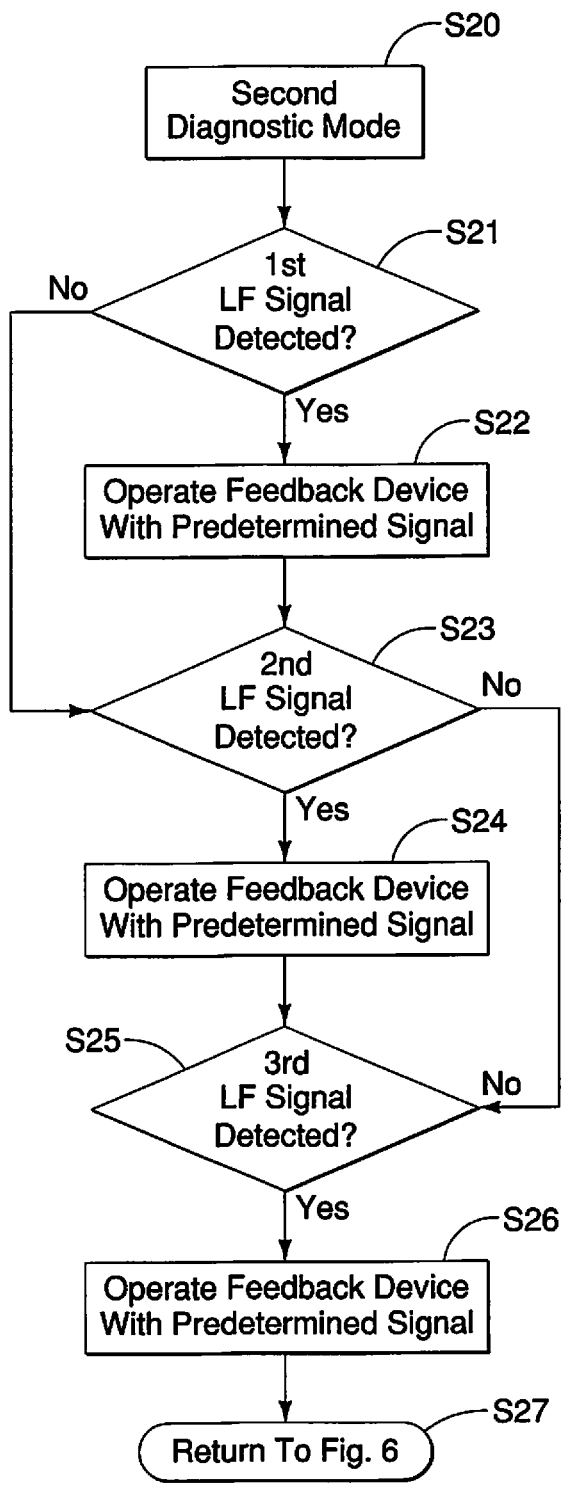
FIG. 7 is a second flowchart showing further logic used by the controller of the keyfob in accordance with the depicted embodiment.

At step S20, the controller 60 moves to the logic set forth in FIG. 7. At step S21 in FIG. 7, the controller 60 determines whether or not a low frequency signal from a first one of the antennae 50, 52 and 54 is being received. If yes, operation moves to step S22. If no, operation moves to step S23. At step S22, one of the feedback devices (or the LED 70) is operated to provide an indication that the first one of the antennae 50, 52 and 54 is operating properly.

At step S23, the controller 60 determines whether or not a low frequency signal from a second one of the antennae 50, 52 and 54 is being received. If yes, operation moves to step S24. If no, operation moves to step S25. At step S24, one of the feedback devices (or the LED 70) is operated to provide an indication that the second one of the antennae 50, 52 and 54 is operating properly.

At step S25, the controller 60 determines whether or not a low frequency signal from a third one of the antennae 50, 52 and 54 is being received. If yes, operation moves to step S26. If no, operation moves to step S27. At step S26, one of the feedback devices (or the LED 70) is operated to provide an indication that the third one of the antennae 50, 52 and 54 is operating properly.

At step S27, operation returns to the logic in FIG. 6.

It should be understood that the logic set forth in FIGS. 6 and 7 are examples of logic that can be employed by the keyfob 12. Other logic steps are possible based on the various descriptions above regarding the diagnostic operations.

The diagnostic mode of the keyfob 12 allows for a simple and convenient way to test the operations of the antennae 50, 52 and 54 of the door lock system 15.

The controller 60 preferably includes a microcomputer with a keyfob control program that controls the keyfob 12 during normal operations and operations in the diagnostic modes. The controllers 16 and 60 can include other conventional components such as an input interface circuit, an output interface circuit, and storage devices such as a ROM (Read Only Memory) device and a RAM (Random Access Memory) device. The microcomputer of the controllers 16 and 60 are programmed to control the keyfob 12. The internal RAM of the controllers 16 and 60 stores statuses of operational flags and various control data. It will be apparent to those skilled in the art from this disclosure that the precise structure and algorithms for the controllers 16 and 60 can be any combination of hardware and software that will carry out the functions of the present invention.

The various vehicle elements and structures other than the keyfob 12 and its diagnostic features, are conventional components that are well known in the art. Since conventional vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle diagnostic system. Accordingly, these terms, as utilized to describe the present invention should be interpreted relative to a vehicle equipped with the vehicle diagnostic system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle diagnostic system, comprising:
a keyfob having an electronic controller, a plurality of command inputs, a keyfob antenna and a feedback device, the plurality of command inputs, the keyfob antenna and the feedback device being in electronic communication with the electronic controller,
the electronic controller being configured to send signals to a vehicle door lock system of a vehicle separated from the keyfob in response to operation one or more of the plurality of command inputs of the keyfob that instruct the vehicle door lock system to switch at least one door between a locked state and an unlocked state,
the electronic controller being further configured to enter a first diagnostic mode in response to a first predetermined operation of the plurality of command inputs such that in the first diagnostic mode the keyfob detects an operating state of the keyfob and in response to a second predetermined operation of the command inputs of the keyfob, the electronic controller enters a second diagnostic mode in which the keyfob operates as a diagnostic tool used to diagnose one-by-one output of each of a plurality of antennas of the vehicle door lock system by moving the keyfob one-by-one into closer proximity to each of the plurality of antennas as compared to the proximity of the keyfob to the other antennas, thereby detecting an operation state thereof, and
the electronic controller operates the feedback device to provide an indication of the operating state of the keyfob and each of the plurality of antennas of the vehicle door lock system of the vehicle.

2. The vehicle diagnostic system according to claim 1, wherein
the keyfob is powered by an internal battery, and
the electronic controller is configured operate the feedback device indicating the operating state of the internal battery in the first diagnostic mode.

3. The vehicle diagnostic system according to claim 2, wherein
the operating state of the internal battery detected by the electronic controller of the keyfob includes an electric power producing state of the internal battery.

4. The vehicle diagnostic system according to claim 2, wherein
the electronic controller is configured operate the feedback device indicating the operating state one-by-one of the plurality of antennas of the vehicle door lock system in the second diagnostic mode.

5. The vehicle diagnostic system according to claim 1, wherein
the feedback device is one of a light emitting diode (LED) or a haptic device configured to produce vibrations within the keyfob.

6. A vehicle diagnostic system, comprising:
a vehicle door lock system of a vehicle that includes a plurality of vehicle antennas within a vehicle body structure that are configured to transmit signals to the keyfob;
a keyfob having an electronic controller, a plurality of command inputs, a keyfob antenna and a feedback device, the plurality of command inputs, the keyfob antenna and the feedback device being in electronic communication with the electronic controller,
the electronic controller being configured to enter a diagnostic mode in response to a predetermined operation of the plurality of command inputs such that in the diagnostic mode the electronic controller operates as a diagnostic tool used to diagnose one-by-one output of each of the plurality of vehicle antennas by moving the keyfob one-by-one into closer proximity to each of the plurality of antennas as compared to the proximity of the keyfob to the other antennas, and doing so for each one of the antennas, one-by-one detecting an operation state thereof and, provides an indication via the feedback device of the operational state of each of the plurality of vehicle antennas of the vehicle.

7. The vehicle diagnostic system according to claim 6, wherein
the electronic controller of the keyfob is further configured to send signals to the vehicle door lock system in response to operation of one of the plurality of command inputs instructing the vehicle door lock system to switch at least one door to one of a locked state and an unlocked state.

8. The vehicle diagnostic system according to claim 6, wherein
the keyfob is powered by an internal battery, and
the electronic controller is further configured operate the feedback device indicating the operating state of the internal battery in the diagnostic mode.

9. The vehicle diagnostic system according to claim 8, wherein
the operating state of the internal battery detected by the electronic controller of the keyfob includes an electric power producing state of the internal battery.

10. The vehicle diagnostic system according to claim 9, wherein
the feedback device is a light emitting diode (LED).

11. The vehicle diagnostic system according to claim 10, wherein
the electronic controller is configured to operate the LED such that predetermined numbers of blinks are produced indicating the electric power producing state of the internal battery.

12. The vehicle diagnostic system according to claim 6, wherein
the feedback device is a haptic device configured to produce vibrations within the keyfob.

13. The vehicle diagnostic system according to claim 6, wherein
the feedback device is a light emitting diode (LED).

14. The vehicle diagnostic system according to claim 6, wherein
the plurality of command inputs includes at least two buttons having contact/no contact switches operated by pushing on corresponding ones of the at least two buttons, and
the predetermined operation of the plurality of command inputs causing the electronic controller to enter the diagnostic mode includes simultaneously pressing on all of the at least two buttons for a predetermined period of time.

15. The vehicle diagnostic system according to claim 14, wherein
the predetermined period of time is at least 10 seconds.

16. The vehicle diagnostic system according to claim 6, wherein
the plurality of command inputs includes three separate buttons each having its own contact/no contact switch operated by pushing on corresponding ones of the three buttons, and
the predetermined operation of the plurality of command inputs causing the electronic controller to enter the diagnostic mode includes simultaneously pressing on all of the three buttons for a predetermined period of time.

17. The vehicle diagnostic system according to claim 16, wherein
the predetermined period of time is at least 10 seconds.

18. The vehicle diagnostic system according to claim 6, wherein
the electronic controller of the keyfob includes a timing circuit, and
the electronic controller is further configured such that after entering the diagnostic mode and determining that a predetermined period of time has passed, the electronic controller exits the diagnostic state.

* * * * *